United States Patent [19]

Mizumura

[11] Patent Number: 5,193,707
[45] Date of Patent: Mar. 16, 1993

[54] LID STRUCTURE INCLUDING SLIDABLE LOCK MEMBER

[75] Inventor: Sadao Mizumura, Tokyo, Japan

[73] Assignee: Asahi Kogaku Kogyo Kabushiki Kaisha, Tokyo, Japan

[21] Appl. No.: 733,145

[22] Filed: Jul. 19, 1991

[30] Foreign Application Priority Data

Aug. 7, 1990 [JP] Japan ............................... 2-83690[U]
Mar. 20, 1991 [JP] Japan ............................... 3-040976[U]

[51] Int. Cl.⁵ ............................................. B65D 45/16
[52] U.S. Cl. ................................... 220/326; 220/324; 220/334; 215/244; 215/245; 292/145; 292/175; 292/DIG. 48
[58] Field of Search .................. 220/324, 326, 334; 429/100, 98, 97; 215/245, 244; 292/DIG. 48, 175, 145

[56] References Cited

U.S. PATENT DOCUMENTS

| | | |
|---|---|---|
| 4,008,356 | 2/1977 | Asano . |
| 4,320,834 | 3/1982 | Tamaki ............................. 292/175 X |
| 4,468,439 | 8/1984 | Ohara et al. . |
| 4,690,878 | 9/1987 | Nakamura ........................ 429/97 X |
| 4,863,812 | 9/1989 | Ueda et al. . |
| 4,965,141 | 10/1990 | Suzuki ............................. 429/100 X |

FOREIGN PATENT DOCUMENTS

| | | |
|---|---|---|
| 368597 | 5/1990 | European Pat. Off. . |
| 2625574 | 12/1977 | Fed. Rep. of Germany . |
| 2610802 | 8/1988 | France . |
| 2056543 | 3/1981 | United Kingdom . |
| 2179328 | 3/1987 | United Kingdom . |
| 2205348 | 12/1988 | United Kingdom . |

OTHER PUBLICATIONS

British Search Report.
German Advertisement Entitled "EOS-Breakthrough Into The New Decade" and English Language translation.

*Primary Examiner*—Shoap, Allan N.
*Assistant Examiner*—Paul A. Schwarz
*Attorney, Agent, or Firm*—Sandler, Greenblum & Bernstein

[57] ABSTRACT

A camera battery storage container is opened and closed by a battery lid which holds a manually operable lock member including an engaging finger engagable with a retaining member on a camera housing. When the engaging finger is disengaged from the retaining member, the battery lid can be opened, giving access to a battery chamber defined in the camera battery storage container. The battery lid has an integral holder by which the manually operable lock member is slidably held.

13 Claims, 6 Drawing Sheets

5A

LID STRUCTURE INCLUDING SLIDABLE LOCK MEMBER

BACKGROUND OF THE INVENTION

1. Field of the Invention

The present invention relates to a lid structure for openably closing an opening of an article storage container, and more particularly to a lid structure comprising a lid for opening and closing such an opening and a manually operable lock member for locking and unlocking the lid, the manually operable lock member being slidably held in the lid.

2. Description of the Relevant Art

There are known lid structures having a lid for closing an opening of an article storage container which has an engaging step and a manually operable lock member, slidably held in the lid and engageable with the engaging step, for locking and unlocking the lid with respect to the article storage container.

The lid structures are generally classified into two groups. In one group, the lid is fully detachable from the article storage container, and in the other group, the lid is hinged and swingable with respect to the article storage container.

In the detachable lid structures, the lid has a retaining member on one end and a manually operable lock member on the other end. In order to mount the lid on the article storage container, the retaining member is brought into engagement with a corresponding portion in the opening of the article storage container. Then the manually operable lock member is brought into engagement with the engaging step of the article storage container. For detachment of the lid, the manually operable lock member is first manipulated out of engagement with the engaging step. Then, the retaining member is disengaged from the article storage member.

In the swingable lid structures, one end of the lid is coupled by a hinge to the article storage container, with the manually operable lock member on the other end of the lid. The lid can be angularly moved to open and close the opening of the article storage container, when the lid is unlocked and locked by the manually operable lock member.

The above lid structures are typically used to openably close the openings of battery containers of various battery-operated devices, such as cameras with electronic mechanisms, portable audio devices, or the like, for example.

One conventional lid structure is shown in FIGS. 5 and 6 of the accompanying drawings. FIG. 5 shows the bottom of an electronically controlled single-lens reflex camera.

The single-lens reflex camera, generally designated by the reference numeral 1, includes a camera housing 3 having a grip 3A on one side thereof. The grip 3A has therein a battery container 5 for storing a battery (not shown). The camera housing 3 includes a lower panel 7 in which an opening 9 of the battery container 5 is defined, with the opening 9 being normally closed by a battery lid 11. The battery container 5 and the battery lid 11 jointly define a battery storage chamber 5A. The battery lid 11 has an end 11A swingably hinged to the lower panel 7. A manually operable lock member 13 is slidably mounted in the other free end of the battery lid 11.

The battery lid 11 is fragmentarily shown in an enlarged scale in FIG. 6. In FIG. 6, the bottom surface of the camera 1 is shown as facing upwardly. The end of the manually operable lock member 13, which end is positioned near the edge of the battery lid 11 remotely from the hinged end 11A, is shown on the lefthand side.

The battery lid 11 has a window 15 defined therein. The manually operable lock member 13 is positioned on the surface of the battery lid 11 which faces into the battery storage chamber 5A. The manually operable lock member 13 has a manipulating ridge 13A projecting on one surface thereof (shown as the upper surface in FIG. 6) and positioned within the window 15. The battery lid 11 has a pair of spaced guide walls 17A, 17B, positioned one on each side of the window 15, for guiding the upper surface of the manually operable lock member 13. The battery lid 11 also has a pair of laterally spaced guide walls 17C, positioned one on each side of the window 15, for guiding the respective lateral sides of the manually operable lock member 13.

To assemble the manually operable lock member 13 in the battery lid 11, the manually operable lock member 13 is inserted, from below in FIG. 6, between the lateral guide walls 17C. Then, the lower surface of the manually operable lock member 13 is held by a holder plate 19. The holder plate 19 is then bonded or fused to a plurality of support posts 21 projecting from the inner surface (shown as the lower surface in FIG. 6) of the battery lid 11.

The manually operable lock member 13 is made of synthetic resin. The manually operable lock member 13 has a spring 13B on a rear end thereof which is positioned inwardly, remote from the free end of the battery lid 11. The spring 13B is resiliently held against a spring bearing surface 23 of the battery lid 11 for normally urging the manually operable lock member 13 forward, i.e., toward the free end of the battery lid 11.

The manually operable lock member 13 has a stop ledge 13C disposed on its upper surface near the spring 13B. When the stop ledge 13C is engaged by a front edge of a recess 25, defined in an inner surface of the battery lid 11, the manually operable lock member 13 is held in a forward position under the bias of the spring 13B.

The manually operable lock member 13 has an engaging finger 13D on its front end. When the manually operable lock member 13 is in the forward position, the engaging finger 13D engages the lower panel 7 of the camera housing 3, closing the opening 9 of the battery container 5, as shown in FIG. 6. When the user shifts the ridge 13A to slide the manually operable lock member 13 rearwardly to the right as shown in FIG. 6, the engaging finger 13D is brought out of engagement with the lower panel 7. The lid 11 is unlocked and can now be angularly moved about the hinged end 11A to open the opening 9.

With the conventional battery lid structure, however, the separate holder plate 19 is necessary to hold the manually operable lock member 13 on the battery lid 11, and a special bonding or fusing process is required to fasten the holder plate 19 to the support posts 21. Consequently, the number of parts used and the number of assembling steps required are increased, resulting in an increase in the cost of the battery lid structure.

SUMMARY OF THE INVENTION

In view of the above shortcomings of the conventional lid structures, it is an object of the present invention to provide a lid structure which is constructed of a reduced number of parts and can be assembled in a reduced number of steps.

According to the present invention, there is provided a lid structure comprising an article storage container having an opening and a retaining member, a lid for openably closing the opening with the lid having an integral holder, and a manually operable lock member slidably held by the holder and slidable into and out of locking engagement with the retaining member.

Since the holder which holds the manually operable lock member is integral with the battery lid, the entire lid structure is composed of a reduced number of parts, and can be assembled in a reduced number of assembling steps.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 5:
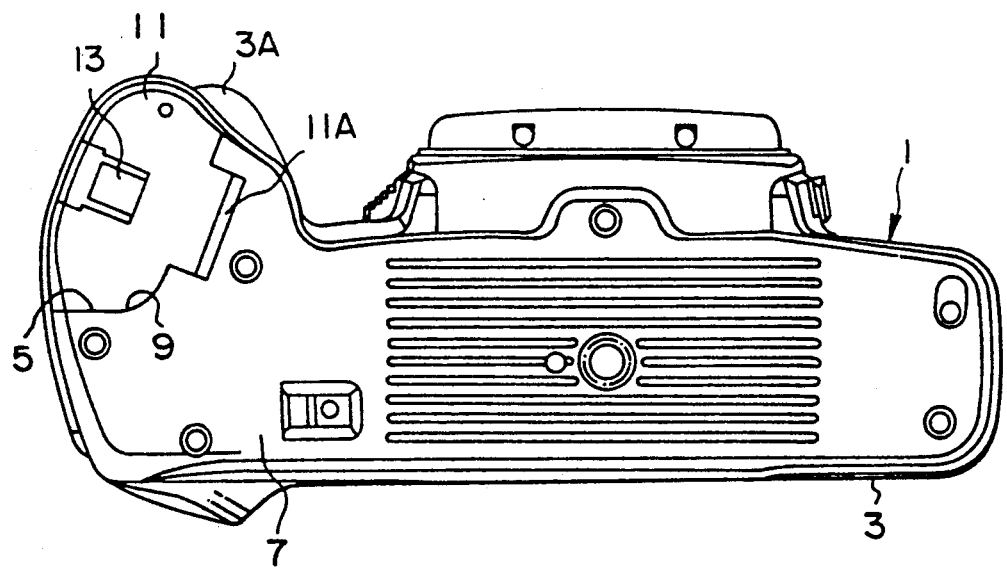
FIG. 5 is a bottom view of a single-lens reflex camera.

The principles of the present invention will be described below as being incorporated in a battery lid structure for the single-lens reflex camera as shown in FIG. 5.

Figure 1:
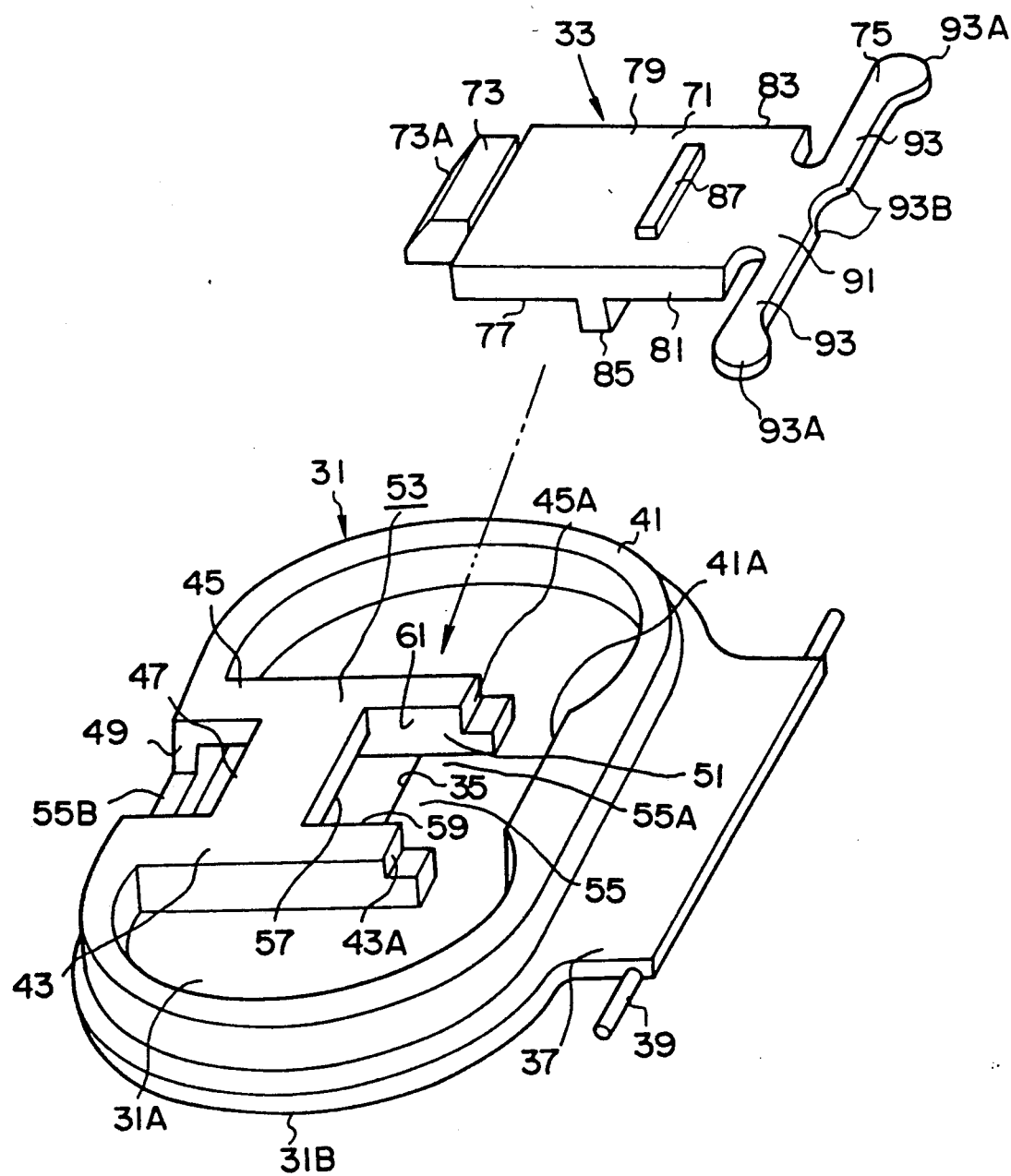
FIG. 1 is an exploded perspective view of a lid structure according to an embodiment of the present invention.

FIG. 1 shows a lid structure according to the present invention, for a battery lid on a single-lens reflex camera. The lid structure is fragmentarily shown in an enlarged scale in FIG. 2 with the bottom surface of the camera being shown as facing upwardly.

Figure 2:
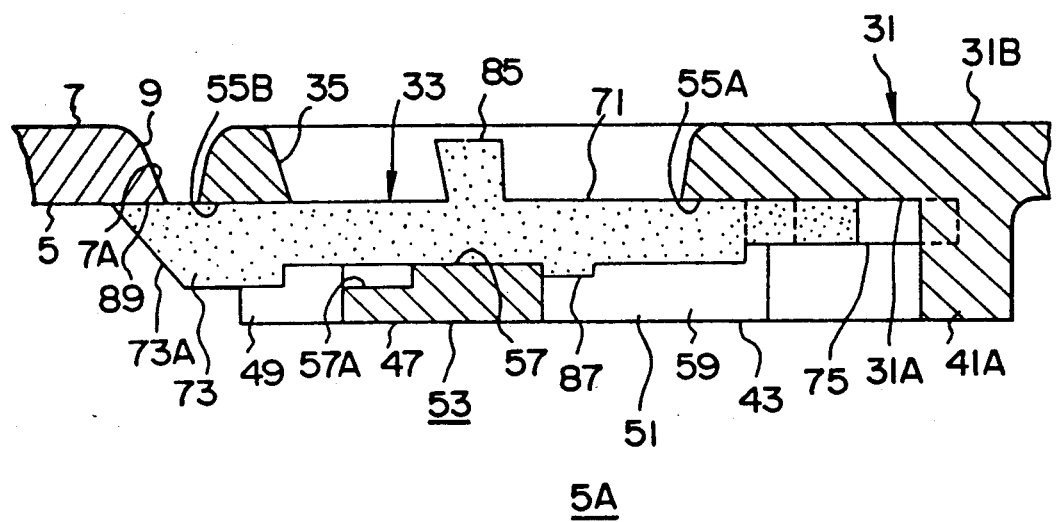
FIG. 2 is an enlarged fragmentary cross-sectional view of the lid structure shown in FIG. 1 which is assembled.

In FIGS. 1 and 2, the battery lid, generally denoted at 31, has a manually operable lock member 33 slidably held therein. The battery lid 31 and the manually operable lock member 33 are formed of synthetic resin by injection molding.

Figure 6:
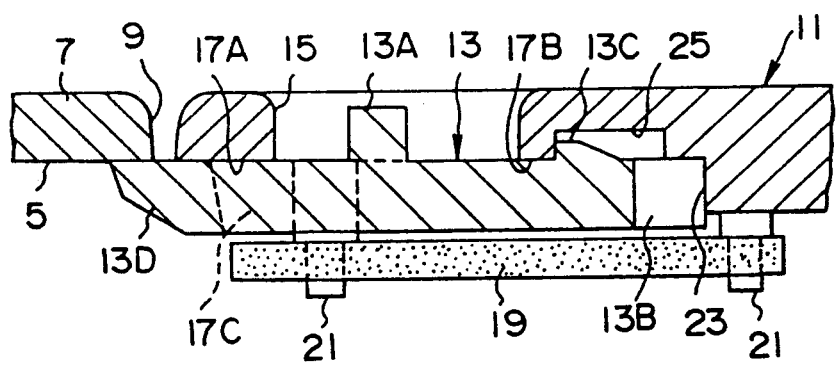
FIG. 6 is an enlarged fragmentary cross-sectional view of a conventional battery lid structure which is incorporated in the single-lens reflex camera shown in FIG. 5.

It is assumed that the battery lid 31 and the manually operable lock member 33 have respective front ends on the lefthand side of FIGS. 1 and 2. The battery lid 31 has a window 35 defined in a front end portion thereof, and a rearwardly projecting tongue 37 on its rear end. The rearwardly projecting tongue 37 has a pin 39 which is mounted on the lower panel 7 (see FIGS. 5 and 6) of the camera housing 3, so that the battery lid 31 is angularly movable about the pin 39, to open and close the opening 9 in the lower panel 7.

The battery lid 31 has an inner surface 31A which faces into the battery chamber 5A in the camera housing 3, and an outer surface 31B exposed at the bottom surface of the camera housing 3. The battery lid 31 also includes a surrounding ridge 41, extending along the outer peripheral edge of the inner surface 31A. The ridge 41 includes a wall 41A, projecting from the rear end thereof toward the front end thereof.

The battery lid 31 also has a pair of parallel spaced side walls 43, 45 disposed on the inner surface 31A, one on each side of the window 35. The side walls 43, 45 extend between the front and rear ends of the battery lid 31, but have respective rear ends terminating short of the wall 41A. The rear ends of the side walls 43, 45 have respective steps 43A, 45A.

The side walls 43, 45 are interconnected by a joint wall 47, extending underneath the window 35 and displaced from the inner surface 31A into the battery chamber 5A.

The side walls 43, 45 and the joint wall 47 have inner surfaces (lower surfaces in FIG. 2) which lie flush with each other. A hole 49 is defined between the side walls 43, 45, in front of the joint wall 47, with the hole 49 communicating with the window 35. An insertion hole 51 is between the side walls 43, 45, behind the joint also defined between the side walls 43, 45, behind the joint wall 47, with the insertion hole 51 communicating with the window 35. The insertion hole 51 has an opening area greater than that of the hole 49.

The manually operable lock member 33 is slidably held between the inner surface 31A and the joint wall 47 and also between the side walls 43, 45. The side walls 43, 45, the joint wall 47, and the inner surface 31A therefore jointly serve as a holder 53 by which the manually operable lock member 33 is slidably held for movement along the side walls 43, 45, with the holder 53 being integral with the battery lid 31.

The holder 53 comprises a first guide surface 55 for guiding a portion of the manually operable lock member 33 which faces toward the inner surface 31A of the battery lid 31, a second guide surface 57 for guiding a portion of the manually operable lock member 33 which faces toward the battery chamber 5A, and third and fourth guide surfaces 59, 61 for guiding laterally opposite portions of the manually operable lock member 33. The third and fourth guide surfaces 59, 61 extend perpendicularly to the first and second guide surfaces 55, 57. The manually operable lock member 33 can be inserted into the holder 53 through the insertion hole 41.

The first guide surface 55 is composed of an inner surface area 55A of the battery lid 31 which is positioned behind the window 35, and an inner surface area 55B of the battery lid 31 which is positioned in front of the window 35. The inner surface area 55B lies flush with the inner surface area 55A. The second guide surface 57 is composed of a surface of the joint wall 47 which faces toward the window 35, and the second guide surface 57 extending parallel to the first guide surface 55. The third and fourth guide surfaces 59, 61 are composed of respective surfaces of the side walls 43, 45 which face toward each other.

The manually operable lock member 33, made of synthetic resin, is elastic enough to act as a spring. The manually operable lock member 33 has a relatively thin rectangular planar portion 71. The manually operable lock member 33 also has an engaging finger 73 on its front end or one of its longitudinal ends, and a spring member 75 on its rear end or the other longitudinal end thereof. The planar portion 71 therefore extends between the engaging finger 73 and the spring member 75.

The planar portion 71 and the engaging finger 73 jointly define a first slide surface 77 which faces toward the inner surface 31A and is guided by the first guide surface 55. The planar portion 71 also defines a second slide surface 79 which faces toward the battery chamber 5A and is guided by the second guide surface 57. The planar portion 71 further defines third and fourth slide surfaces 81, 83 on its opposite sides, which are guided by the third and fourth guide surfaces 59, 61, respectively.

The first slide surface 77 has a manipulating ridge 85 projecting thereon. The second slide surface 79 has a stop ridge 87 projecting thereon.

The engaging finger 73 is shaped so as to engage a retaining member 89 of the lower panel 7 at an edge of the opening 9. The engaging finger 73 is thicker, but narrower, than the planar portion 71, and has a tapered surface 73A on its end, remote from the planar portion 71.

The spring member 75 normally urges the manually operable lock member 33 in a direction causing the engaging finger 73 to engage the retaining member 89. The spring member 75 comprises two legs 93, extending away from each other from a neck 91 joined to the rear end of the planar potion 71. The legs 93 extend linearly substantially parallel to the rear edge of the planar portion 71, and have respective engaging portions 93A on their rear ends.

In order to attach the manually operable lock member 33 to the battery lid 31, the engaging finger 73 and then the planar portion 71 are successively inserted from the insertion hole 51 into the hole 49 on the side of the inner surface 31A of the battery lid 31. More specifically, the spring member 75 is flexed downwardly (FIG. 2), and the third and fourth slide surface 81, 83 of the planar portion 71 are guided by the respective third and fourth guide surfaces 59, 61 of the holder 53. At the same time, the planar portion 71 and the engaging finger 73 are flexed convexly in an upward direction (as shown in FIG. 2) while the engaging finger 73 is being inserted into the hole 49. The manually operable lock member 33 is pushed until the front edges of the legs 93 abut against the steps 43A, 45A, respectively, so that the engaging finger 73 projects from the hole 49.

As shown in FIG. 2, the second guide surface 57 has a recess 57A, defined in the front end thereof, for allowing the engaging finger 73 to pass into the hole 49 when the manually operable lock member 33 is inserted.

With the manually operable lock member 33 mounted on the battery lid 31, the manipulating ridge 85 is positioned in the window 35. The first and second slide surfaces 77, 79 of the manually operable lock member 33 are slidably held against the first and second guide, surfaces 55, 57, respectively, of the holder 53. The and the third and fourth slide surfaces 81, 83 are slidably held against the third and fourth guide surfaces 59, 61, respectively. Thus, the manually operable lock member 33 is slidably held by the holder 53 for sliding movement selectively in forward and rearward directions.

The planar portion 71 is slidably held by the holder 53. The spring member 75 is disposed outside of the holder 53 against the inner surface 31A behind the holder 53.

The engaging portions 93A, of the legs 93 of the spring member 75, engage the ridge 41 on the rear end of the battery lid 31. The manually operable lock member 33 is normally urged under the resiliency of the legs 93 in the direction to cause the engaging finger 73 to engage the retaining member 89 of the lower panel 7. The movement of the manually operable lock member 33, in the forward direction, is limited by the stop ridge 87 that abuts against the rear end of the joint wall 47.

The forward direction of the manually operable lock member 33 is the direction in which the engaging finger 73 is displaced into engagement with the retaining member 89. The rearward direction thereof is the direction in which the engaging finger 73 is displaced out of engagement with the retaining member 89. The insertion hole 51 is located at the rear end of the joint wall 47 which is remote from the retaining member 89 in the rearward direction.

To detach the manually operable lock member 33 from the battery lid 31, the spring member 75 is flexed downwardly (as shown in FIG. 2) out of engagement with the ridge 41, and the planar portion 71 and the engaging finger 73 are flexed convexly downwardly (FIG. 2), while the manually operable lock member 33 is being retracted in the rearward direction. The engaging finger 73 is pulled out of the hole 49 and then the insertion hole 51. The planar portion 71 is pulled out of the insertion hole 51.

Operation of the lid structure of the above embodiment will be described below.

The manually operable lock member 33 is normally urged in the forward direction under the resiliency of the spring member 75. The manually operable lock member 33 is held in a forward position when its forward movement is limited by the stop ridge 87 which is held against the rear end of the joint wall 47. In the forward position, the engaging finger 73 projects from the front edge of the battery lid 31. When the battery lid 31 is closed, the engaging finger 73 engages the engaging member 89 of the lower panel 7, thereby locking the battery lid 31 which closes the opening 9.

To open the battery lid 31, the manipulating ridge 85 is manually displaced in the rearward direction. The manually operable lock member 33 is now displaced rearwardly against the bias of the spring member 75 while the first slide surface 77 is being guided by the first guide surface 55, the second slide surface 79 by the second guide surface 57, and the third and fourth slide surfaces 81, 83 by the third and fourth guide surfaces 59, 61, respectively.

When a central portion 93B of the spring member 73, between the legs 93, abuts against the wall 41A of the battery lid 31, the rearward displacement of the manually operable lock member 33 is limited. Since the engaging finger 73 is now disengaged from the engaging portion 89 of the lower panel 7, the battery lid 31 can be angularly opened about the pin 39.

To lock the battery lid 31 in the closed position, the battery lid 31 is closed while the manually operable lock member 33 is being retracted rearwardly by the manipulating ridge 85. With the battery lid 31 in the closed position, the manipulating ridge 85 is released, allowing the manually operable lock member 33 to move forwardly under the bias of the spring member 75 until the stop ridge 87 is engaged by the rear end of the joint wall 47. The engaging finger 73 now projects from the front edge of the battery lid 31, and is held in locking engagement with the engaging member 89 of the lower panel 7.

The battery lid 31 may alternatively be locked in the closed position as follows:

The manually operable lock member 33 is not retracted by the manipulating member 85, but the engaging finger 73 is kept in the forward position and in light contact with the upper end of the front edge of the opening 9 in the lower panel 7. When the battery lid 31 is depressed strongly, the tapered surface 73A of the engaging finger 73 slidingly engages a tapered surface 7A of the opening 9, thus pushing the manually operable lock member 33 rearwardly from the forward position toward the rearward position. As the battery lid 31 is depressed to a certain position, the tapered surface 73A descends clear of the tapered surface 7A, permitting the manually operable lock member 33 to move forward under the bias of the spring member 75 until the engaging member 73 is brought into locking engagement with the engaging member 89 of the lower panel 7.

According to the above embodiment, since the holder 53 which holds the manually operable lock member 33, is integral with the battery lid 31, the entire lid structure is composed of a reduced number of parts, and can be assembled in a reduced number of assembling steps.

As described above, the engaging finger 73 and the planar portion 71 are inserted into the holder 53 through the insertion hole 51 so that the engaging finger 73 and the planar portion 71 are held in the holder 53, but the spring member 75 is disposed outside of the holder 53. Therefore, the configuration of the spring member 75 and the angle through which the legs 93 thereof are spread away from each other can freely be designed without being limited by the shapes of the holder 53 and the insertion hole 51. The free designing capability for the spring member 75 is advantageous because it is possible to select a desired setting for the load to be applied to the manually operable lock member 33, when it is manipulated to open and close the battery lid 31.

A lid structure according to another embodiment of the present invention, which is designed as a battery lid structure for the single-lens reflex camera shown in FIG. 5, will be described below with reference to FIGS. 3 and 4.

Figure 3:
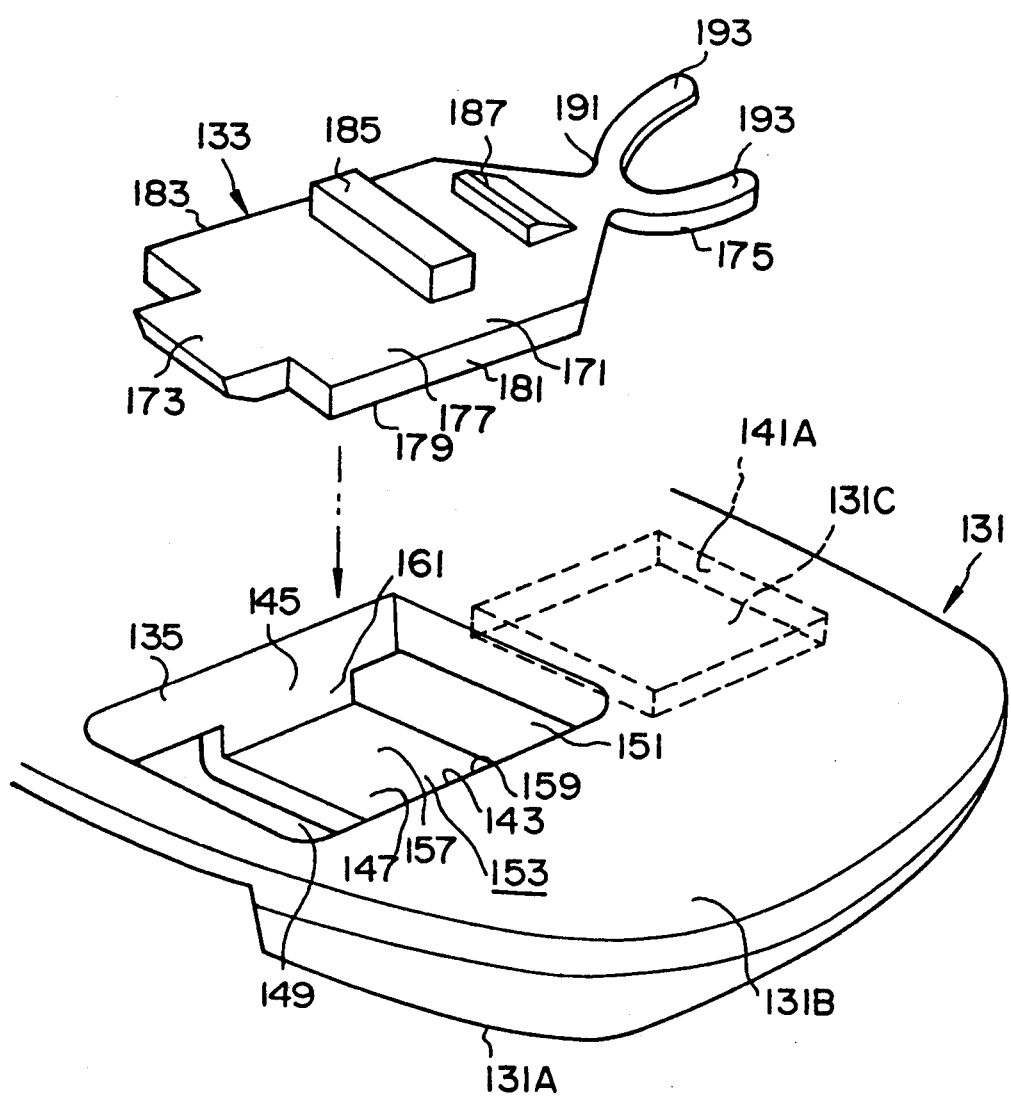
FIG. 3 is an exploded perspective view of a lid structure according to another embodiment of the present invention.

FIG. 3 shows a lid structure for a battery lid on a single-lens reflex camera. The lid structure is fragmentarily shown in an enlarged scale in FIG. 4 with the bottom surface of the camera being shown as facing upwardly. Those parts in FIGS. 3 and 4 which are identical to those shown in FIGS. 1 and 2 are denoted by identical reference characters.

Figure 4:
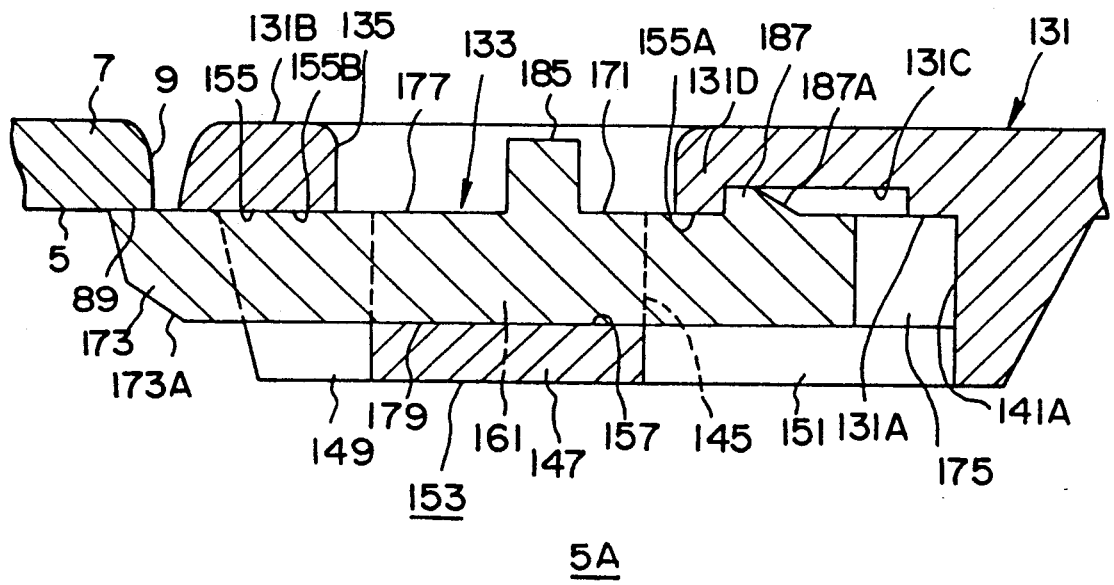
FIG. 4 is an enlarged fragmentary cross-sectional view of the lid structure shown in FIG. 3 which is assembled.

In FIGS. 3 and 4, the battery lid, generally denoted at 131, has a manually operable lock member 133 slidably held therein. The battery lid 131 and the manually operable lock member 133 are made by injection molding using synthetic resin.

It is assumed that the battery lid 131 and the manually operable lock member 133 have respective front ends on the lefthand side of FIGS. 3 and 4. The battery lid 131 has a window 135 defined in a front end portion thereof, and a pin (not shown) on its rear end. The pin is mounted on the lower panel 7 (see FIGS. 5 and 6) of the camera housing 3, so that the battery lid 131 is angularly movable about the pin to open and close the opening 9 in the lower panel 7.

The battery lid 131 has an inner surface 131A which faces into the battery chamber 5A in the camera housing 3, and an outer surface 131B exposed at the bottom surface of the camera housing 3. The battery lid 131 also includes a pair of parallel spaced side walls 143, 145 disposed on the inner surface 131A with one on each side of the window 135. The side walls 143, 145 extend between the front and rear ends of the battery lid 131, and are interconnected by a joint wall 147, extending underneath the window 135 and displaced from the inner surface 131A into the battery chamber 5A.

The side walls 143, 145 and the joint wall 147 have inner surfaces shown (lower surfaces in FIG. 4) which lie flush with each other. A hole 149 is defined between the side walls 143, 145 in front of the joint wall 147, with the hole 149 communicating with the window 135. An insertion hole 151 is also defined between the side walls 143, 145 behind the joint wall 147, with the insertion hole 151 communicating with the window 135.

The manually operable lock member 133 is slidably held between the inner surface 131A and the joint wall 147, and also between the side walls 143, 145. The side walls 143, 145, the joint wall 147, and the inner surface 131A therefore jointly serve as a holder 153 by which the manually operable lock member 133 is slidably held for movement along the side walls 143, 145, with the holder 153 being integral with the battery lid 131.

The holder 153 comprises a first guide surface 155 for guiding a portion of the manually operable lock member 133 which faces toward the inner surface 131A of the battery lid 131, a second guide surface 157 for guiding a portion of the manually operable lock member 133 which faces toward the battery chamber 5A, and third and fourth guide surfaces 159, 161 for guiding laterally opposite portions of the manually operable lock member 133. The third and fourth guide surfaces 159, 161 extend perpendicularly to the first and second guide surfaces 155, 157.

The first guide surface 155 is composed of an inner surface area 155A of the battery lid 131 which is positioned behind the window 135, and an inner surface area 155B of the battery lid 131 which is positioned in front of the window 135, the inner surface area 155B lies flush with the inner surface area 155A. The second guide surface 157 is composed of a surface of the joint wall 147 which faces toward the window 135. The second guide surface 157 extends parallel to the first guide surface 155. The third and fourth guide surfaces 159, 161 are composed of respective surfaces of the side walls 143, 145 which face toward each other.

The manually operable lock member 133, made of synthetic resin, is elastic enough to act as a spring. The manually operable lock member 133 has a relatively thin rectangular planar portion 171. The manually operable lock member 133 also has an engaging finger 173 on its front end or one of its longitudinal ends, and a spring member 175 on its rear end or the other longitudinal end thereof. The planar portion 171 therefore extends between the engaging finger 173 and the spring member 175.

The window 135 is of such a shape as to be able to insert the manually operable lock member 133, composed of the planar portion 171, the engaging finger 173, and the spring member 175, into the holder 153.

The planar portion 171 and the engaging finger 173 jointly define a first slide surface 177 which faces toward the inner surface 131A and is guided by the first guide surface 155. The planar portion 171 also defines a second slide surface 179 which faces toward the battery chamber 5A and is guided by the second guide surface 157. The planar portion 171 further defines third and fourth slide surfaces 181, 183 on its opposite sides which are guided by the third and fourth guide surfaces 159, 161, respectively.

The first slide surface 177 has a manipulating ridge 185 projecting thereon and a stop ridge 187 projecting thereon. The manipulating ridge 185 and the stop ridge 187 are spaced from each other between the front and rear ends of the first slide surface 177.

The stop ridge 187 is movably disposed in a recess 131C which is defined in the inner surface 131A of the battery lid 131. The stop ridge 187 has a front surface lying perpendicularly to the planar portion 171. The perpendicular front surface is engageable with a front edge 131D of the recess 131 to hold the manually operable lock member 133 in a forward position. The stop ridge 187 also has a sloping surface 187A behind the perpendicular front surface.

When the manually operable lock member 133 is in a forward position, the engaging finger 173 is engageable with the retaining member 89 of the lower panel 7. When the manipulating ridge 185 is pushed to retract the manually operable lock member 133 to a rearward position, the engaging finger 173 disengages from the retaining member 89.

The engaging finger 173 is narrower than the planar portion 171, and has a tapered surface 173A on its end remote from the planar portion 171.

The spring member 175 normally urges the manually operable lock member 133 in a direction causing the engaging finger 173 to engage the retaining member 189. The spring member 175 comprises two legs 193 extending arcuately from each other from a neck 191 which is joined to the rear end of the planar potion 171.

In order to attach the manually operable lock member 133 to the battery lid 131, the engaging finger 173 is inserted from above the window 135 through the window 135 into the hole 149.

When the manually operable lock member 133 is pushed until the manipulating member 185 abuts against the front edge of the window 135, the spring member 175 is flexed and displaced into the window 135.

Then, the manipulating member 185 is pulled back retracting the manually operable lock member 133 until the stop ridge 187 is forced into the recess 131C in the inner surface 131A.

With the manually operable lock member 133 mounted on the battery lid 131, the manipulating ridge 185 is positioned in the window 135. The first and second slide surfaces 177, 179 of the manually operable lock member 133 are slidably held against the first and second guide surfaces 155, 157, respectively, of the holder 153. The third and fourth slide surfaces 181, 183 are slidably held against the third and fourth guide surfaces 159, 161, respectively. Thus, the manually operable lock member 133 is slidably held by the holder 153 for sliding movement selectively in forward and rearward directions.

Since the front surface of the stop ridge 187 lies perpendicular perpendicularly to the planar portion 171, the stop ridge 187 cannot easily be removed from the recess 131C once it is forcibly pushed into the recess 131C.

After the stop ridge 187 has been placed in the recess 131C, the legs 193 of the spring member 175 are flexed by contact with a wall 141A positioned behind the rear end of the first guide surface 155. Therefore, after the battery lid 131 and the manually operable lock member 133 have been assembled together, the manually operable lock member 133 is normally urged forwardly under the resiliency of the legs 193. The movement of the manually operable lock member 133 in the forward direction is limited by the stop ridge 187 that abuts against the front edge 181D of the recess 181C.

To detach the manually operable lock member 133 from the battery lid 131, the rear portion of the planar portion 171 is flexed downwardly (as shown in FIG. 4) to displace the stop ridge 187 out of the recess 131C. Then, the manually operable lock member 133 is pushed forwardly until the manipulating ridge 185 engages the front edge of the window 135. The spring member 175 is flexed upwardly (as shown in FIG. 4) out of the window 135, and the planar portion 171 and the engaging finger 173 are pulled upwardly out of the window 135.

The manipulating ridge 185 may be operated on to lock and unlock the battery lid 131 for closing and opening the opening 9 in the same manner as described above with reference to the preceding embodiment.

With the integral holder 153 on the battery lid 131, the entire lid structure is made up of a reduced number of parts, and can be assembled in a reduced number of assembling steps.

In the above embodiments, the battery lids 31, 131 are angularly movably supported on the lower panel 7 of the camera housing 3 by means of the pins. However, the battery lid 131 may be integrally coupled to the lower panel 7 through an integral molding process. The joint between the battery lid 131 and the lower panel 7 may be thin enough to make the battery lid 131 flexible with respect to the lower panel 7 so that the battery lid 131 can open and close the opening 9. Alternatively, the battery lid 131 may be coupled to the lower panel 7 by a hinge, or may detachably be coupled to the lower panel 7.

The present invention may be applied to not only battery lids for cameras, but also battery lids for portable audio devices and other battery-operated appliances. The present invention is also applicable to lid structures for openings of battery containers, and lid structures for openings of various other article storage containers.

Although certain preferred embodiments of the present invention have been shown and described in detail, it should be understood that various changes and modifications may be made therein without departing from the scope of the appended claims.

What is claimed is:

1. A lid structure comprising:
   an article storage container having an opening and a retaining member;
   a lid for openably closing said opening, said lid having an integral holder, said article storage container and said lid jointly defining an article storage chamber, said lid having an inner surface facing towards said article storage chamber, said holder being integrally formed on said inner surface;
   a manually operable lock member slidably held by said holder and slidable into and out of locking engagement with said retaining member said manually operable lock member being slidable in a sliding direction, said holder having a first guide surface for guiding a portion of said manually operable lock member which faces toward said lid, a second guide surface for guiding a portion of said manually operable lock member which faces towards said article storage container, and third and fourth guide surfaces for guiding opposite portions of said manually operable lock member which lie along said sliding direction;

said lid defining a window, said manually operable lock member comprising a manipulating ridge on a portion of said lock member facing said lid, said manipulating ridge disposed in said window;

said holder being defined by said lid having a pair of side walls disposed on said inner surface, one of said pair of sidewalls being disposed on each side of said window and extending along said sliding direction, and a joint wall spaced from said inner surface toward said article storage container and interconnecting said sidewalls over said window, said first guide surface being disposed on said inner surface along said sliding direction, said second guide surface being disposed on said joint wall in facing relationship to said window and extending parallel to said first guide surface, said third and fourth guide surfaces being disposed on said side walls parallel to each other and in facing relationship to each other;

said manually operable lock member being formed of resilient synthetic resin, and comprising a spring member for normally urging said manually operable member in a direction engaging said retaining member, said manually operable lock member comprising an engaging finger on a longitudinal end of said manually operable lock member for engaging said retaining member, said spring member being disposed on another longitudinal end of said manually operable lock member, said manually operable lock member having a planar portion extending between said engaging member and said spring member and having surfaces slidable against said first, second, third and fourth guide surfaces; and said window formed so as to enable insertion of said manually operable lock member into said holder.

2. The lid structure according to claim 1, within said spring member is disposed against said inner surface of said lid outside of said holder, said inner surface having a wall for engaging said spring member.

3. The lid structure according to claim 1, said manually operable lock member comprising a stop ridge disposed on said planar portion projecting away from said article storage container, said lid comprising a recess opening towards said article storage chamber, said stop ridge being engagable with an end of said recess for limiting sliding movement of said manually operable lock member in a direction causing said engaging finger to engage said retaining member.

4. The lid structure according to claim 1, said article storage container comprising a battery container defining a battery chamber for a camera, said battery chamber having said opening, said lid comprising a battery lid for openably closing said opening.

5. A lid structure comprising:

an article storage container having an opening and a retaining member;

a lid for openably closing said opening, said lid having an integral holder, said article storage container and said lid jointly defining an article storage chamber, said lid having an inner surface facing towards said article storage chamber, said holder being integrally formed on said inner surface;

a manually operable lock member slidably held by said holder and slidable into and out of locking engagement with said retaining member, said manually operable lock member being slidable in a sliding direction, said holder having a first guide surface for guiding a portion of said manually operable lock member which faces toward said lid, a second guide surface for guiding a portion of said manually operable lock member which faces towards said article storage container, and third and fourth guide surfaces for guiding opposite portions of said manually operable lock member which lie along said sliding direction;

said lid defining a window, said manually operable lock member comprising a manipulating ridge on a portion of said lock member facing said lid, said manipulating ridge disposed in said window;

said holder being defining by said lid having a pair of side walls disposed on said inner surface, one of said pair of side walls being disposed on each side of said window and extending along said sliding direction, and a joint wall spaced from said inner surface toward said article storage container and interconnecting said sidewalls over said window, said first guide surface being disposed on said inner surface along said sliding direction, said second guide surface being disposed on said joint wall in facing relationship to said window and extending parallel to said first guide surface, said third and fourth guide surfaces being disposed on said side walls parallel to each other and in facing relationship to each other;

said manually operable lock member being formed of resilient synthetic resin, and comprising a spring member for normally urging said manually operable member in a direction engaging said retaining member, said manually operable member comprising an engaging finger on a longitudinal end of said manually operable lock member for engaging said retaining member, said spring member being disposed on another longitudinal end of said manually operable lock member, said manually operable lock member having a planar portion extending between said engaging member and said spring member and having surfaces slidable against said first, second, third and fourth guide surfaces;

said lid comprising an insertion hole defined at an end of said joint wall remote from said retaining member and communicating with said window, for inserting said engaging member and said planar portion into said holder; and said manually operable lock member comprising a stop ridge disposed on said planar portion projecting toward said article storage container and engagable with said joint wall for limiting sliding movement of said manually operable lock member in a direction causing said engaging finger to engage said retaining member.

6. The lid structure according to claim 5, within said spring member is disposed against said inner surface of said lid outside of said holder, said inner surface having a wall for engaging said spring member.

7. The lid structure according to claim 5, said manually operable lock member comprising a stop ridge disposed on said planar portion projecting away from said article storage container, said lid comprising a recess opening towards said article storage chamber, said stop ridge being engagable with an end of said recess for limiting sliding movement of said manually operable lock member in a direction causing said engaging finger to engage said retaining member.

8. The lid structure according to claim 5, said article storage container comprising a battery container defining a battery chamber for a camera, said battery chamber having said opening, said lid comprising a battery lid for openably closing said opening.

9. A lid structure comprising:
an article storage container having an opening and a retaining member;
a lid for openably closing said opening, said lid having an integral holder, said article storage container and said lid jointly defining an article storage chamber, said lid having an inner surface facing towards said article storage chamber and a surface opposite said inner surface, said holder being integrally formed on said inner surface;
a manually operable lock member slidably held by said holder and slidable into and out of locking engagement with said retaining member, said manually operable lock member being formed of resilient synthetic resin and comprising an integrally formed spring member for normally urging said manually operable lock member in a direction engaging said retaining member, said spring member being disposed at a first end of said manually operable lock member, means for engaging said retaining member disposed at a second end of said manually operable lock member, said second end being opposite said first end, said manually operable lock member between said first and second ends comprising a manipulating ridge on a outwardly facing generally planar surface and a stop ridge on a planar surface facing said article storage container, said stop ridge engagable with a wall of said holder for limiting sliding movement of said manually operable lock member in a direction causing said engaging means to engage said retaining member.

10. A lid structure according to claim 9, wherein said spring member is disposed against said inner surface of said lid outside of said holder, said inner surface having a wall for engaging said spring member.

11. The lid structure according to claim 10, said window shaped so as to enable insertion of said manually operable lock member into said holder.

12. The lid structure according to claim 9, wherein said article storage container comprises a battery container for a camera, said battery container defining said opening, said lid comprising a battery lid for openably closing said opening.

13. The lid structure according to claim 9, said lid defining an insertion hole remote from said retaining member, said insertion hole communicating with said window for inserting said engaging member into said holder.

* * * * *